United States Patent
Osterday et al.

(10) Patent No.: US 10,155,399 B2
(45) Date of Patent: Dec. 18, 2018

(54) PRODUCT MOLDING SYSTEM AND METHOD OF LABELING MOLDED PRODUCTS

(71) Applicant: Inteva Products, LLC, Troy, MI (US)

(72) Inventors: John R. Osterday, Arcanum, OH (US); Steven L. Snead, Miamisburg, OH (US)

(73) Assignee: INTEVA PRODUCTS, LLC, Troy, MI (US)

(*) Notice: Subject to any disclaimer, the term of this patent is extended or adjusted under 35 U.S.C. 154(b) by 149 days.

(21) Appl. No.: 15/196,512

(22) Filed: Jun. 29, 2016

(65) Prior Publication Data

US 2016/0375701 A1    Dec. 29, 2016

Related U.S. Application Data

(60) Provisional application No. 62/186,072, filed on Jun. 29, 2015.

(51) Int. Cl.
| | |
|---|---|
| *B41J 3/407* | (2006.01) |
| *B29C 44/58* | (2006.01) |
| *B29C 44/60* | (2006.01) |
| *B29C 45/76* | (2006.01) |
| *B29C 65/48* | (2006.01) |
| *B29L 31/00* | (2006.01) |
| *B29C 45/17* | (2006.01) |

(52) U.S. Cl.
CPC ............. *B41J 3/4075* (2013.01); *B29C 44/58* (2013.01); *B29C 44/60* (2013.01); *B29C 45/76* (2013.01); *B29C 65/48* (2013.01); *B29C 2045/1796* (2013.01); *B29C 2945/76993* (2013.01); *B29L 2031/744* (2013.01)

(58) Field of Classification Search
CPC .......... B29C 2945/76314; B29C 44/58; B29C 44/60; B29C 45/76; B29C 65/48; B29C 2045/1796; B29C 2945/76993; B41J 3/4075; B29L 2031/744
See application file for complete search history.

(56) References Cited

U.S. PATENT DOCUMENTS

| | | | |
|---|---|---|---|
| 5,294,052 A | 3/1994 | Kukesh | |
| 5,750,162 A * | 5/1998 | Schad | ................... B29C 45/045 425/533 |
| 9,802,345 B2 * | 10/2017 | Gehring | ................ B29C 45/162 |
| 2007/0252297 A1 | 11/2007 | Sperry et al. | |

* cited by examiner

*Primary Examiner* — Vishal I Patel
(74) *Attorney, Agent, or Firm* — Cantor Colburn LLP (57) ABSTRACT

A system for printing a label for a molded object is provided. The system includes a molding machine. A mold is provided having a first part and a second part, the mold being removably coupled to the molding machine. The mold first part and second part being movable between an open and closed position. An RFID module is coupled to the mold first part. An RFID reader is arranged to receive a signal from the RFID module when the mold first part is in the closed position. A controller is operably coupled to the RFID reader, wherein the controller includes a processor that is responsive for receiving an object identification data in response to the RFID reader receiving the signal from the RFID module. A printer configured to print a label including the object identification data in response to the controller receiving the signal.

12 Claims, 5 Drawing Sheets

PRODUCT MOLDING SYSTEM AND METHOD OF LABELING MOLDED PRODUCTS

CROSS REFERENCE TO RELATED APPLICATIONS

This application claims the benefit of U.S. Provisional Application Ser. No. 62/186,072, filed Jun. 29, 2015, the entire disclosure of which is incorporated herein by reference.

BACKGROUND OF THE INVENTION

The subject matter disclosed herein relates to a system for molding products from a plastic material, such as an injection molding system and in particular to a molding system that allows for the automatic printing of labels associated with the molded part.

Injection molding systems, are often used to fabricate products and components, such as vehicle seats or other vehicle interior components for example. These products are often marked with an adhesive backed label. These labels may include specific product information such as a bar code for example, or may be serialized to allow traceability and lot control. These systems use a mold that is fabricated to form the product in the desired shape. The molds may be interchanged to allow the same system to fabricate different products. It should be appreciated that a modern large manufacturing facility may have many such molding systems where the molds may be used.

It may be desirable to use the same mold in different molding systems to increase the efficiencies of operation and avoid bottlenecks in the manufacturing of products. Since a particular mold may be used in a variety of different molding systems within a facility or even in different facilities, it may be difficult to ensure that the proper labels are associated with the corresponding products when the molds are made. Mislabeling of the product may result in a number of issues, including: having to scrap products, the wrong components being sent to further subsequent manufacturing processes, the wrong parts being shipped to customers, incorrect inventory status and reduced ability for production lot control. It should be appreciated that proper association of the label to the molded product is desired Accordingly, while existing product molding systems are suitable for their intended purposes the need for improvement remains, particularly in providing a molding system that is automatically associates the correct label with the molded product.

BRIEF DESCRIPTION OF THE INVENTION

According to one aspect of the invention, a system for printing a label for a molded object is provided. The system comprising: a molding machine; a mold having a first part and a second part, the mold being removably coupled to the molding machine, the mold first part and the mold second part being movable between an open position and a closed position, the mold being operable to form an object when in the closed position; an RFID module coupled to the mold first part; an RFID reader arranged to receive a signal from the RFID module when the mold first part is in the closed position; a controller operably coupled to the RFID reader, wherein the controller includes a processor that is responsive to executable computer instructions for receiving an object identification data in response to the RFID reader receiving the signal from the RFID module; and a printer operably coupled to the controller, the printer configured to print a label including the object identification data in response to the controller receiving the signal from the RFID module.

According to another aspect of the invention, a method of printing a label for a molded object is provided. The method comprising: placing a mold in a molding machine, the mold having a first part and a second part, the first part including an RFID module, the mold first part and the mold second part being movable between an open position and a closed position; moving the mold first part and the mold second part to one of the open position or the closed position; activating the RFID module with an operating field transmitted by an RFID reader operably coupled to the molding machine when the mold first part and the mold second part are in the one of the open position or the closed position; transmitting a signal from the RFID module to the RFID reader, the signal including object data for an object that may be fabricated using the mold; printing a label on a printer adjacent the molding machine in response to receiving the signal, the label including information associated with the object; removing a molded object from the mold; and affixing the label to the molded object.

According to yet another aspect of the invention, a system for printing a label for a molded object. The system comprising: a first molding machine configured to receive a mold; a second molding machine configured to receive the first mold; a first mold having a first part and a second part, the first mold sized and shaped to mold a first object, the first mold being removably coupled to the first molding machine, the first mold first part and the first mold second part being movable between an open position and a closed position, the first mold being operable to form the first object when in the closed position; a first RFID module coupled to the first mold first part; a first RFID reader arranged adjacent the first molding machine and positioned to receive a first signal from the first RFID module when the first mold first part is in the closed position; a controller operably coupled to the first RFID reader, wherein the controller includes a processor that is responsive to executable computer instructions for receiving an object identification data in response to the first RFID reader receiving the first signal from the first RFID module; and a first printer arranged adjacent the first molding machine, the first printer operably coupled to the controller, the first printer configured to print a first label including a first object identification data in response to the controller receiving the first signal from the first RFID module.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in allowing for the automatic association of a product produced in a molding machine with a desired label. Embodiments of the invention provide advantages in allowing for the automatic providing of a time stamp on a label for use. Embodiments of the invention provide advantages in allowing a single foam molding machine to quickly and easily be automatically configured to fabricate different objects.

Figure 1:
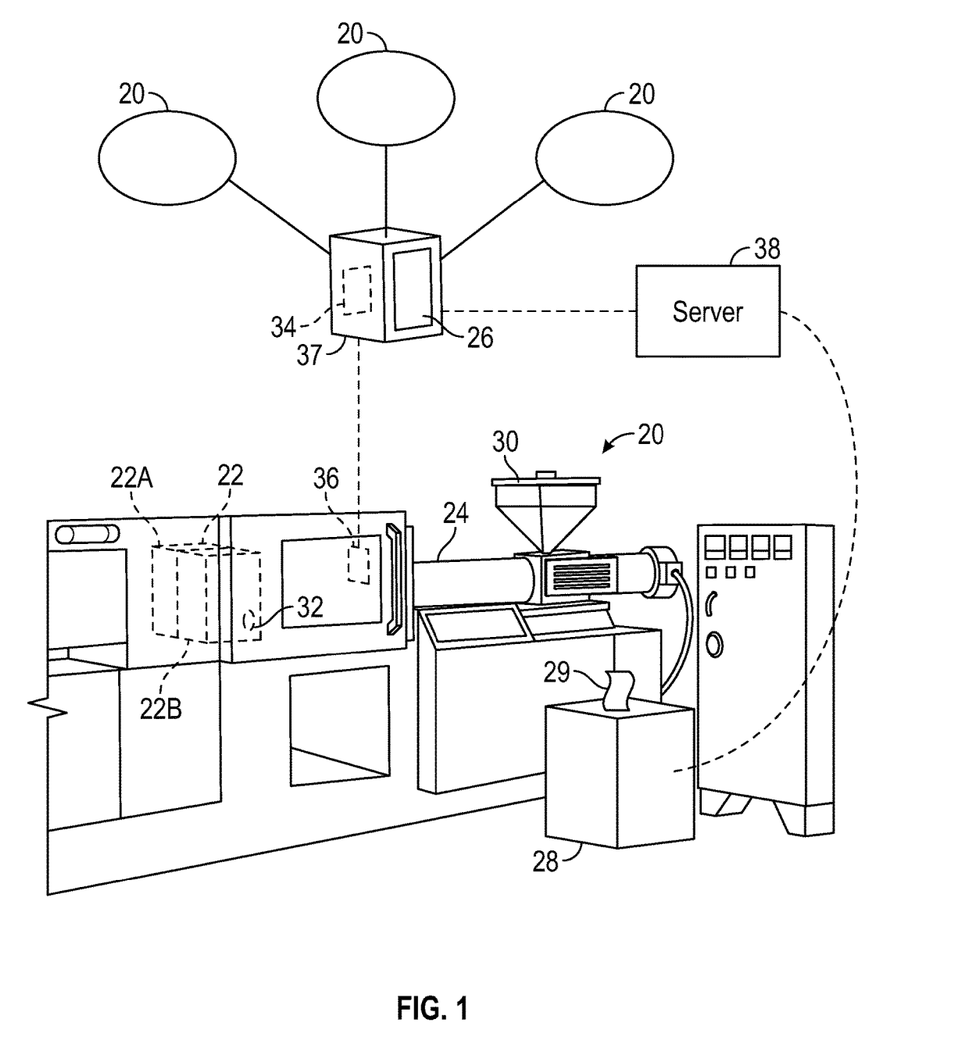
FIG. 1 is a perspective view illustrating a molding machine in accordance with an embodiment of the invention.

Referring now to FIG. 1, an exemplary molding machine 20 is illustrated that may be used to fabricate objects made from a plastic material. It should be appreciated that while embodiments herein describe the object as being fabricated with a particular plastic material or plastic molding process, this is for exemplary purposes and the claimed invention should not be so limited. The object may also include other materials, such as a vinyl skin and plastic or metal retainer components for example. Further, the molding machine 20 may be an injection molding machine, a blow molding machine or a foam molding machine. The molding machine 20 includes a removable mold 22, an injector assembly 24 a printer 28.

The injector assembly 24 is an assembly that stores, mixes and transfers the plastic material with the desired parameters as is known in the art. The injector assembly 24 may include material storage modules 30 for holding the constituent materials, mixing modules for combining the constituent materials together, along with valves and pumps to control the flow of the pre-mixed and mixed materials. Operably coupled to the injector assembly 24 is a removable mold 22. The mold 22 typically is formed from a first half 22A and a second half 22B. The mold halves 22A, 22B are movable relative to each other between a closed position and an open position. In the closed position, the mold 22 is configured to receive plastic material from the injector assembly 24. Once the injected plastic material hardens within the mold 22, the mold halves 22A, 22B move to the open position to allow the formed object to be removed.

As will be discussed in more detail herein the mold 22 includes an radio frequency identification (RFID) circuit, sometimes referred to as an RFID tag or RFID module 32. After the object is removed, the process is repeated until the desired number of objects is formed. The RFID module 32 may be compliant with one or more of the International Organization for Standarization (ISO), the International Electrotechnical Commission (IEC), American Standards of Testing and Materials (ASTM) or DASH7 Alliance standards for example.

When the operator desires to fabricate a different object, the mold 22 is replaced with another mold sized and shaped for the new object. It should be appreciated that different objects that are formed by the molding machine 20 could have different functional specifications or shapes. As a result, the even if different objects use the same base material, the molds 22 may be different.

It should be appreciated that the molding machine 20 may include other systems or subsystems, such as a user interface and a controller 34 that is responsive to executable computer code for controlling the operation of the molding machine 20.

As will be discussed in more detail herein, a radio frequency reading device, such as an RFID reader 36 for example, may be coupled to the molding machine 20. This RFID reader 36 is compliant with one or more of the International Organization for Standarization (ISO), the International Electrotechnical Commission (IEC), American Standards of Testing and Materials (ASTM) or DASH7 Alliance standards for example. In the exemplary embodiment, the RFID reader 36 is configured to transfer or receive data from modules at a predetermined distance, such as the distance from the RFID reader 36 to the RFID module 32 when the mold is in the closed position. It should be appreciated that while embodiments herein refer to RFID as the type of communication arrangement, the claimed invention should not be so limited. In other embodiments the communications may be a near field or NFC arrangement. The term "near field communications" refers to a communications system that allows for a wireless communications between two devices over a short or close range, typically less than 5 inches (127 millimeters).

In the exemplary embodiment, the RFID reader 36 is configured to communicate with a central control 37. The central control 37 may be arranged centrally within a work cell containing a plurality of molding machines 20. The central control 37 may include a controller 34 and a user interface 26. The controller 34 may include one or more communications circuits that allows the controller 34 to communicate with a network server 38.

It should be appreciated that while the RFID reader 36 is illustrated as being coupled to the molding machine, in other embodiments, the reader 36 may be mounted a separately, or coupled to the printer 28. In still another embodiment, the RFID reader 36 may communicate with a network server 38, either directly, via the controller 34 or through the printer 28.

Figure 2:
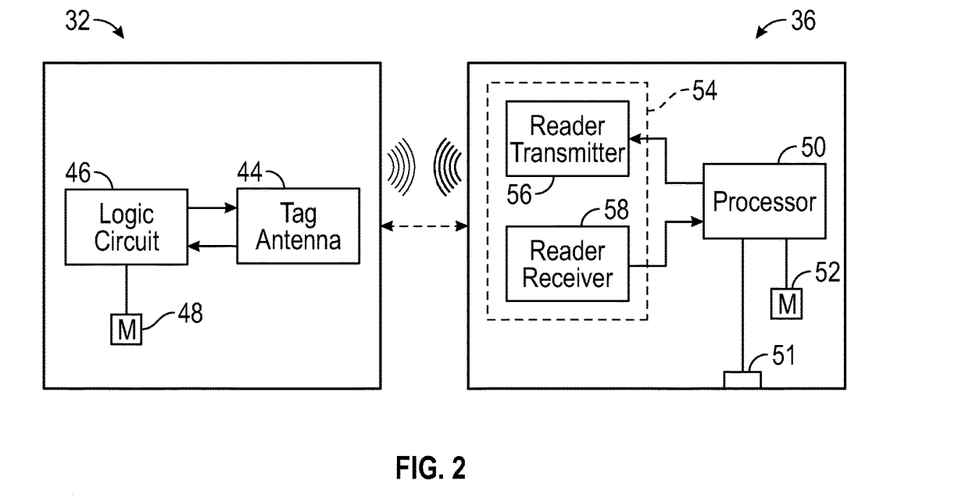
FIG. 2 is a schematic illustration of an RFID module and RFID reader for use with the molding machine of FIG. 1 in accordance with an embodiment of the invention.

Referring now to FIG. 2, an exemplary RFID module 32 (sometimes referred to as a listening device) and RFID reader 36 (sometimes referred to as a polling device). The use of RFID further provides advantages in that communications may be established and data exchanged between the RFID module 32 and the reader 36 without the RFID module 32 having a power source such as a battery. To provide the electrical power for operation of the RFID module 32, the reader 36 emits a radio frequency (RF) field (the Operating Field). Once the RFID module 32 is moved within the Operating Field, the RFID module 32 and reader 36 are inductively coupled, causing current flow through a module antenna 44. The generation of electrical current via inductive coupling provides the electrical power to operate the RFID module 32 and establish communication between the module and reader, such as through load modulation of the Operating Field by the RFID module 32. The modulation may be direct modulation, frequency-shift keying (FSK)

modulation or phase modulation, for example. In one embodiment, the transmission frequency of the communication is 13.56 megahertz with a data rate of 106-424 kilobits per second.

In one embodiment, the RFID module 32 includes a logic circuit 46 that may include one or more logical circuits for executing one or more functions or steps in response to a signal from the antenna 44. It should be appreciated that logic circuit 46 may be any type of circuit (digital or analog) that is capable of performing one or more steps or functions in response to the signal from antenna 44. In one embodiment, the logic circuit 46 may further be coupled to one or more memory devices 48 configured to store information, such as an object part number or a part description for example. The information stored in memory device 48 may be accessed by logic circuit 46. RFID modules 32 may be configured to read and write many times from memory 48 (read/write mode) or may be configured to write only once and read many times from memory 48 (card emulation mode). For example, where only static instrument configuration data is stored in memory 48, the RFID module 32 may be configured in card emulation mode to transmit the configuration data in response to a RFID reader 36 being brought within range of the antenna 44.

In addition to the circuits/components discussed above, in one embodiment the RFID module 32 may also include a power rectifier/regulator circuit, a clock extractor circuit, and a modulator circuit. The Operating Field induces a small alternating current (AC) in the antenna when the reader is brought within range of the module. The power rectifier and regulator converts the AC to stable DC and uses it to power the RFID module, which immediately "wakes up" or initiates operation. The clock extractor separates the clock pulses from the Operating Field and uses the pulses to synchronize the logic, memory, and modulator sections of the RFID module 32 with the RFID reader 36. The logic circuit separates the 1's and 0's from the Operating Field and compares the data stream with its internal logic to determine what response, if any, is required. If the logic circuit determines that the data stream is valid, it accesses the memory section for stored data. The logic circuit encodes the data using the clock extractor pulses. The encoded data stream is input into the modulator section. The modulator mixes the data stream with the Operating Field by electronically adjusting the reflectivity of the antenna at the data stream rate. Electronically adjusting the antenna characteristics to reflect RF is referred to as backscatter. Backscatter is a commonly used modulation scheme for modulating data on to RF carrier. In this method of modulation, the tag coil (load) is shunted depending on the bit sequence received. This in turn modulates the RF carrier amplitude. The RFID reader 36 detects the changes in the modulated carrier and recovers the data.

It should be appreciated that while embodiments herein disclose the operation of the RFID module 32 in a passive mode, meaning an initiator/reader device provides an Operating Field and the RFID module 32 responds by modulating the existing field, this is for exemplary purposes and the claimed invention should not be so limited. In other embodiments, the RFID module 32 may operate in an active mode, meaning that the RFID module 32 and the RFID reader 36 may each generate their own Operating Field. In an active mode, communication is performed by the RFID module 32 and reader device alternately generating an Operating Field. When one of the RFID module 32 and RFID reader 36 is waiting for data, its Operating Field is deactivated. In an active mode of operation, both the RFID module 32 and the RFID reader 36 may have its own power supply.

It should be appreciated that the RFID reader 36 may be incorporated in the printer 28, the molding machine or be a separate device, such as a portable device that is carried by the operator or mounted on the molding machine itself. In one embodiment, a reader device 33 communicates wirelessly with the controller 34 such as via a cellular teleconference circuit (including LTE, GSM, EDGE, UMTS, HSPA and 3GPP cellular network technologies), Bluetooth (IEEE 802.15.1 and its successors) or Wifi (IEEE 802.12) for example. The RFID reader 36 may be a computing device or a general computing device, such as a cellular (smart) phone or a tablet computer for example. The RFID reader 36 includes a processor 50 coupled to one or more memory modules 52. The processor 50 may include one or more logical circuits for executing computer instructions. The processor may include one or more circuits, such as a clock circuit for example. As will be discussed in more detail herein, the clock circuit may be used to incorporate a time stamp onto a label affixed to the molded object. The processor 50 may further include or be coupled to one or more communications circuits 51. The communications circuit 51 couples the processor to an external device or system (e.g. the controller 34, printer 28 or server 38. The communications circuit 51 may allow for wired or wireless communication between the controller 34 and the RFID reader 36.

Coupled to the processor 50 is a radio 54. The radio 54 includes a transmitter 56 that transmits an RF field (the Operating Field) that induces electric current in the RFID module 32. Where the RFID module 32 operates in a read/write mode, the transmitter 56 may be configured to transmit signals, such as commands or data for example, to the RFID module 32.

The RFID radio 54 may further include a receiver 58. The receiver 58 is configured to receive signals from, or detect load modulation of, the Operating Field by the RFID module 32 and to transmit signals to the processor 50. In the exemplary embodiment, the receiver 58 is configured to receive signals from RFID module 32 when the mold halves 22A, 22B are in the closed position. Further, while the transmitter 56 and receiver 58 are illustrated as separate circuits, this is for exemplary purposes and the claimed invention should not be so limited. In other embodiments, the transmitter 56 and receiver 58 may be integrated into a single module. In one embodiment, the antennas are configured to transmit and receive signals in the 120 kilohertz to 13.56 megahertz frequency.

Figure 3:
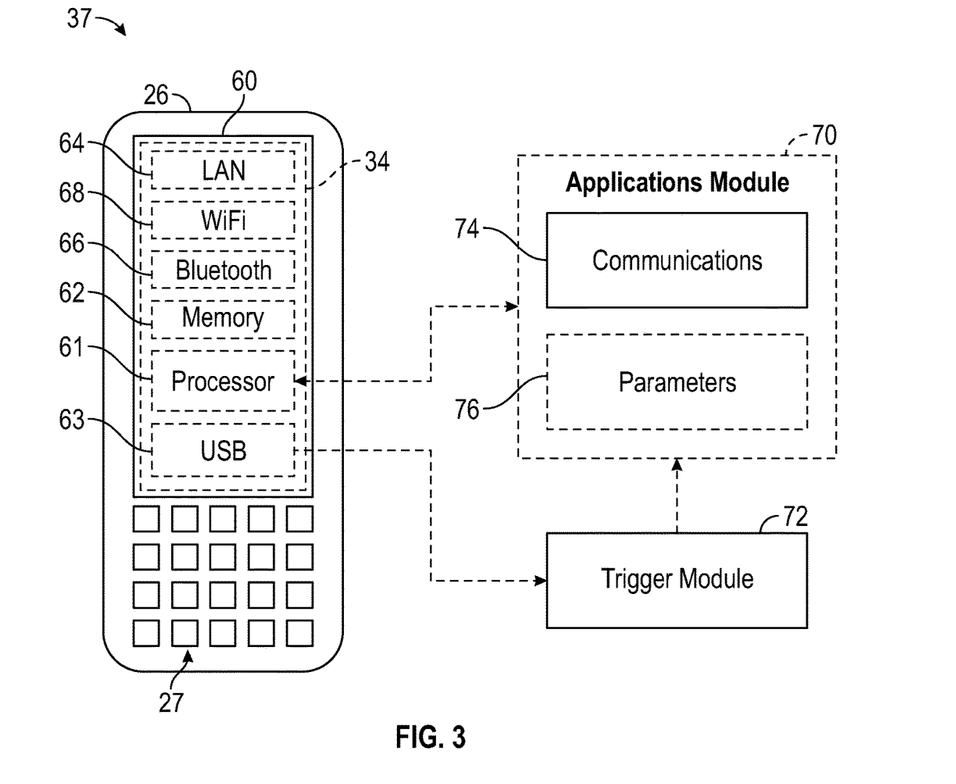
FIG. 3 is a schematic illustration of a controller for the molding machine of FIG. 1 in accordance with an embodiment of the invention.

Referring now to FIG. 1 and FIG. 3, an embodiment is shown with the RFID reader 36 integrated with user interface 26 and controller 34. It should be appreciated that while embodiments herein refer to the central control 37 as being coupled to a plurality of molding machines 20, this is for exemplary purposes and the claimed invention should not be so limited. In other embodiments, the central control 37 may be coupled to a single molding machine 20. Further the central control 37 may be incorporated into a portable or detachable computing device such as a cellular phone, a smart pad, laptop computer, or other type of processing device.

In one embodiment, the user interface 26 includes a graphical user interface (GUI) that allows the user to view data, such as the mold part number or the object description for example. In one embodiment, the user interface displays a screen such as that shown in FIGS. 4 and 5 for example. In one embodiment, user interface 26 includes a display 60 that is a touch screen device which allows the user to input information and control the operation of the user interface 26 using their fingers. In one embodiment, the user interface 26 may include a user input device such as a keypad 27 for example.

Figure 6:
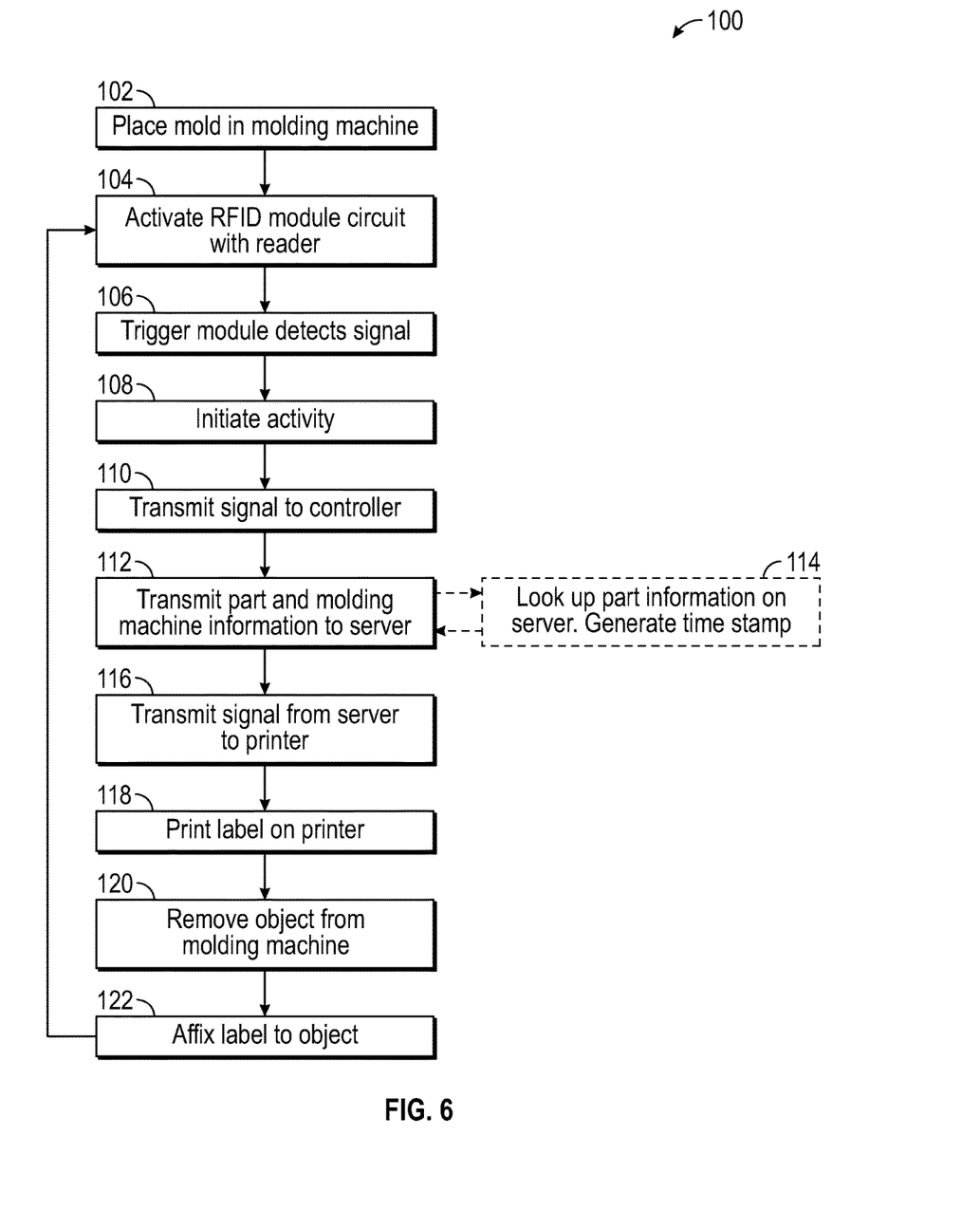
FIG. 6 is a flow chart illustrating the operation of the molding machine of FIG. 1 in accordance with an embodiment of the invention.

The controller 34 includes a processor 61 that is responsive to executable computer instructions and to perform functions or control methods, such as those illustrated in FIG. 6 for example. Controller 34 may further include memory 62, such as random access memory (RAM) or read-only memory (ROM) for example, for storing application code that is executed on the processor 61 and storing data, such as coordinate data for example. The controller 34 further includes communications circuits, such as a serial communications bus interface 63 (e.g. universal serial bus or USB), local area network (LAN) circuit 64, Bluetooth circuit 66 and WiFi circuit 68 for example. The communications circuits 63, 64, 66, 68 are transceivers, meaning each is capable of transmitting and receiving signals. It should be appreciated that the controller 34 may include additional components and circuits as is known in the art.

Controller 34 may further include additional modules or engines 70, which may be in the form of application software that execute on processor 61 and may be stored in memory 62. In one embodiment, a trigger module 72 is provided that cooperates with the one of the communications circuits to activate one or more modules 70 in response to receiving a signal when the RFID module 32 is brought within range of the RFID reader 36 (e.g. when the mold 22 closes). In one embodiment, the trigger module 72 initiates the downloading of parameters associated with the object to be fabricated in the mold 22, such as the object part number, the object description. The trigger module 72 may further initiate the recording of a time data (a time stamp) of the time when the trigger module 72 was activated.

In another embodiment, the parameter values are stored in a look-up table, such as may be stored in memory 62. In still other embodiments, the parameters are stored in a remote network computer server 38 with the RFID module 32 providing a pointer or identification of the mold 22. The remote computer server 38 may be arranged on the local area network or in a distributed/cloud computer network. It should be appreciated that the remote computer server 38 may be comprised of multiple computers in a distributed computing configuration.

The module 70 may also include a communications module 74 that establishes communications with the RFID reader 36 and the network server 38 for example. The modules 70 may also include a parameters module 76, which allow the operator to display or change settings and parameter values.

Once the RFID module 32 and the controller 34 establish communication via the RFID reader 36, a label may be printed for adherence to the object when it is removed from the mold 22. In the exemplary embodiment, the controller 34 transmits a signal to the network server 38. The signal transmitted to the network server may include data such as the mold identification data, the object part number, the object description, a molding machine identification data, or a printer identification data for example. The network server, retrieves from memory object label data, such as from a database. At least a portion of this object label data is then transmitted to the printer associated with the molding machine which initiated the signal when the mold was closed. It should be appreciated that the network server may identify the printer to send the information to from the signal transmitted by the controller 34. This identification of the printer may be through a look-up table or a database for example. The identification may also be directly transmitted to the network server, such as by including the IP address of the printer in the signal transmitted by the controller to the network server. The object label data may include information such as but not limited to: the object part number, the object description, a time stamp when the signal was received from the controller, and a machine readable symbol image (e.g. a bar code) that incorporates information of at least one of the foregoing.

In addition to transmitting data retrieved from a database, the network server may generate additional data, such as time and date data. Further, it should be appreciated that the network server 38 may generate an image of a label based on predetermined criteria and transmit a signal of the generated image to the printer 28.

Figure 4:
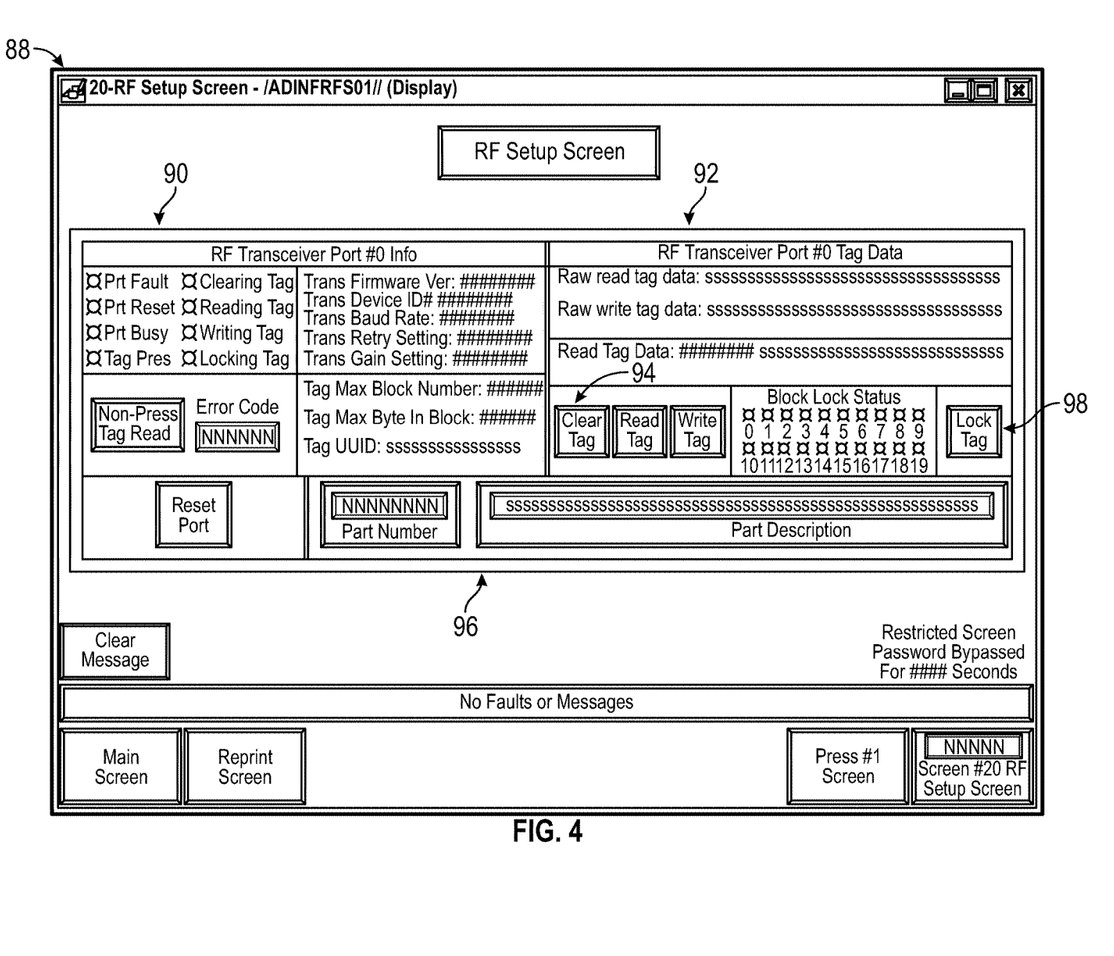
FIG. 4 is an illustration of a graphical user interface for use with the RFID module of FIG. 1 displaying an information for writing data to the RFID module in accordance with an embodiment of the invention.

FIG. 4 illustrates an exemplary GUI 88 that is used to program the RFID module 32. In the exemplary embodiment, the GUI 88 is secured using a password to allow authorized operators to make changes to the data stored on the RFID module 32. The GUI 88 includes information 90 on the RFID reader 33, including the status, reader ID and parameters. The GUI 88 further include information 92 on the RFID module 32 and may include virtual buttons 94 that allow the user to clear the RFID module 32, read the RFID module and write-to the RFID module. The GUI 88 also allows the user to input a plurality of values 96 that define the parameters for the object to be produces by the mold 22. Finally, the GUI 88 includes a virtual button 98 that allows the user to lock the RFID module 42 and prevent operators from changing the values.

Figure 5:
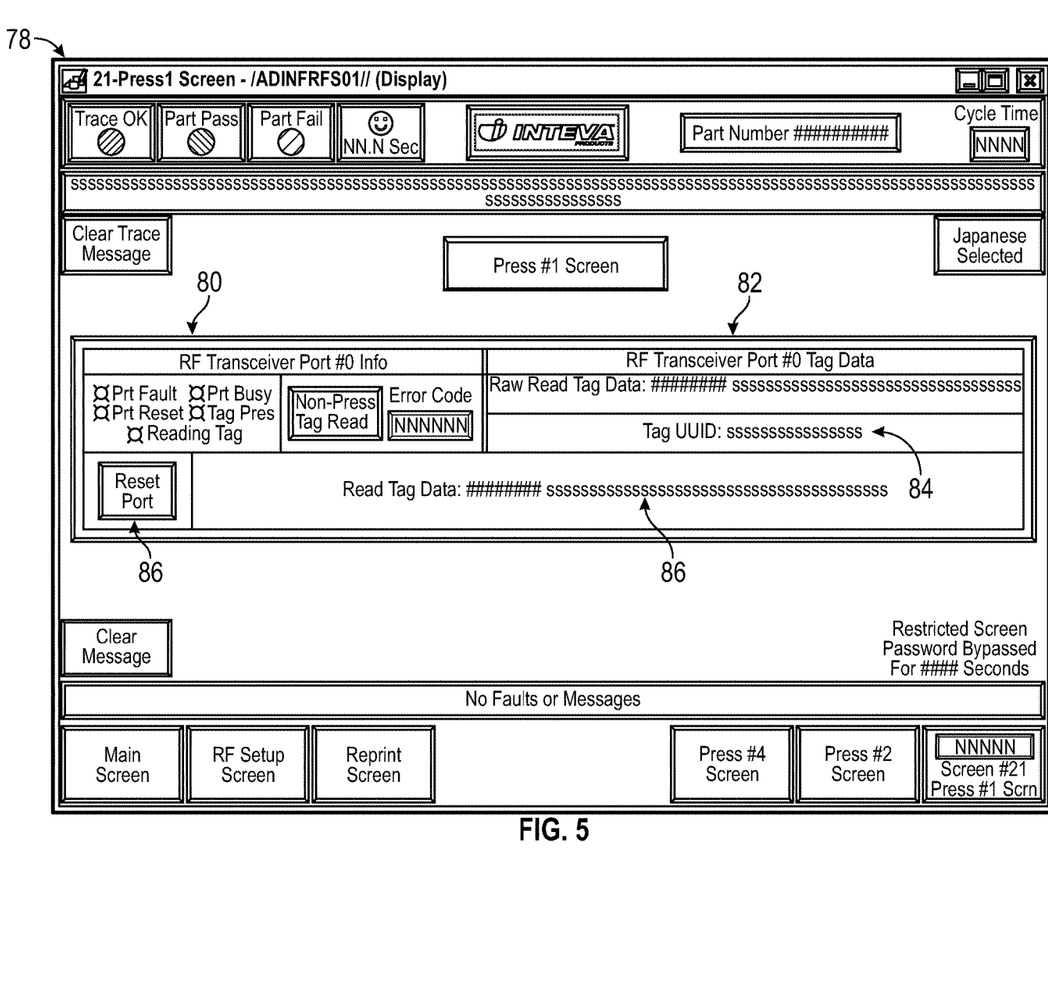
FIG. 5 is an illustration of a graphical user interface for use with the molding machine of FIG. 1 displaying the RFID read module information in accordance with an embodiment of the invention.

FIG. 5 illustrates an exemplary GUI 78 displayed on the display 60 to the operator 32 when the RFID module 32 is read by the RFID reader 36. The information displayed on the GUI 78 includes RFID reader 36 status indicators 80, RFID module data 82, RFID module ID 84 and module data 86. A reset button 86 may be provided to reset the RFID reader 36.

Referring now to FIG. 6, a process 100 is shown for fabricating objects in a molding machine 20. The process 100 starts by placing the mold 22 in the molding machine 20 in box 102. When the RFID module 32 is brought within range of the RFID reader 36 (e.g. by closing the mold halves 22A, 22B), the RFID module 32 is activated as discussed above. The signal from the RFID module 32 is detected by the trigger module 72 and the processor 50 initiates' activities in box 108. The activity may include the transmission of a signal from the RFID module 32 to the RFID reader 36, where the signal include the identification values for the object being formed by mold 22 or and identification value (e.g. RFID module UUID) that allows the parameter values to be determined in either a look-up table or on a remote server based. The signal may further include a time data of when the mold 22 was closed. The process 100 then proceeds to transmit this data to the controller 34 in box 110. Upon receiving the signal from the RFID reader 36 by the controller 34, the method 100 proceeds to transmit a signal to the network server 38 in box 112.

The network server 38 uses the data transmitted by the controller 34 to look up, such as in a database for example, the part information for the object that was molded in mold 22 in box 114. The part information may include data that is to be printed on the label. Such object label data may include, but is not limited to: object part number, object description, customer information, date information, time information, customer instruction information, customer warning information, company logos, and bar code or other machine readable images for example. The network server 38 then transmits in box 116 a signal to the printer 28 that is associated with the molding machine 20 that the object is being molded. As discussed above, the network server may generate a label image that includes at least a portion of the object label data. The network server may further generate a time data or date data for the label as well. The signal transmitted to the printer 28 may include at least a portion of the object label data or an image of the label incorporating at least a portion of the object label data. The printer 28 prints a label 29 (FIG. 1) in box 118. When the molding operation is completed, the method 100 then proceeds to block 120 where the operator removes the object from the mold 22 and affixes the label 29 to the object 122. If additional objects need to be fabricated, the method 100 then loops back to block 104. The process continues until all of the objects that are desired to be molded have been fabricated.

It should be appreciated that while embodiments herein illustrate the molding machine 20 as an injection molding machine, embodiments of the invention may also be used with other types of plastic molding or metal forming equipment. For example, embodiments of the invention may be used with a foam molding machine or a sheet-metal press for example. In embodiments where the object is being made from metal, the mold 22 may be referred to as a die.

Further, in another embodiment, the RFID module 32 may be the same as that described in U.S. Patent Application 62/031,179 filed on Jul. 31, 2014 the contents of which are incorporated herein by reference. In this embodiment, the RFID module 32 may include additional information, such as the molding parameters or material parameters for the molding process. This information may be transferred from the RFID module 32 to the molding machine. It should be appreciated that the RFID module 32 may be a single device or the functionality may be embodied in several devices.

A technical effect of embodiments of the invention includes the automatic printing of a label for affixing to an object being molded in an adjacent molding machine.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for printing a label for a molded object, the system comprising:
   a molding machine;
   a mold having a first part and a second part, the mold being removably coupled to the molding machine, the mold first part and the mold second part being movable between an open position and a closed position, the mold being operable to form an object when in the closed position;
   an RFID module coupled to the mold first part;
   an RFID reader arranged to receive a signal from the RFID module when the mold first part is in the closed position;
   a controller operably coupled to the RFID reader, wherein the controller includes a processor that is responsive to executable computer instructions for receiving an object identification data in response to the RFID reader receiving the signal from the RFID module; and
   a printer operably coupled to the controller, the printer configured to print the label including the object identification data in response to the controller receiving the signal from the RFID module.

2. The system of claim 1 wherein the controller is further responsive for generating time data in response to receiving the signal from the RFID module.

3. The system of claim 2 wherein the printer is further configured to print the time data on the label.

4. The system of claim 2 further comprising a network server operably coupled between the controller and the printer, wherein the controller is further responsive for transmitting a second signal to the network server in response to receiving the signal from the RFID module.

5. The system of claim 4 wherein the network server further includes a second processor responsive to executable instructions when executed on the second processor for retrieving object data from memory in response to receiving the second signal.

6. The system of claim 5 wherein the network server is further responsive to transmitting a third signal to the printer in response to retrieving the object data.

7. The system of claim 6 wherein the third signal includes at least one of an object part number, an object description, customer information, date information, time information, customer instruction information, customer warning information, a company logo or a machine readable image.

8. A system for printing a label for a molded object, the system comprising:
   a first molding machine configured to receive a first mold;
   a second molding machine configured to receive the first mold;
   a first mold having a first part and a second part, the first mold sized and shaped to mold a first object, the first mold being removably coupled to the first molding machine, the first mold first part and the first mold second part being movable between an open position and a closed position, the first mold being operable to form the first object when in the closed position;
   a first RFID module coupled to the first mold first part;
   a first RFID reader arranged adjacent the first molding machine and positioned to receive a first signal from the first RFID module when the first mold first part is in the closed position;
   a controller operably coupled to the first RFID reader, wherein the controller includes a processor that is responsive to executable computer instructions for receiving an object identification data in response to the first RFID reader receiving the first signal from the first RFID module; and
   a first printer arranged adjacent the first molding machine, the first printer operably coupled to the controller, the first printer configured to print a first label including a first object identification data in response to the controller receiving the first signal from the first RFID module.

9. The system of claim 8 further comprising:
   a second mold having a first part and a second part, the second mold sized and shaped to mold a second object, the second mold being removably coupled to the second molding machine, the second mold first part and the second mold second part being movable between an open position and a closed position, the second mold being operable to form the second object when in the closed position;
   a second RFID module coupled to the second mold first part;
   a second RFID reader arranged adjacent the second molding machine and positioned to receive a second signal from the second RFID module when the second mold first part is in the closed position, the second RFID reader being operably coupled to the controller;

a second printer arranged adjacent the second molding machine, the second printer operably coupled to the controller, the second printer configured to print a second label including a second object identification data in response to the controller receiving the second signal from the second RFID module.

10. The system of claim 9 further comprising a network server operably coupled between the controller and the first printer, the network server further being operably coupled between the controller and the second printer.

11. The system of claim 10 wherein the network server is configured to receive a first object label data from a memory in response to the first signal and a second object label data in response to the second signal.

12. The system of claim 11 wherein the network server is further configured to transmit the first object label data to the first printer and the second object label data to the second printer.

* * * * *